Sept. 7, 1943.   M. E. REAGAN   2,329,083
CONTROL SYSTEM
Filed April 17, 1942
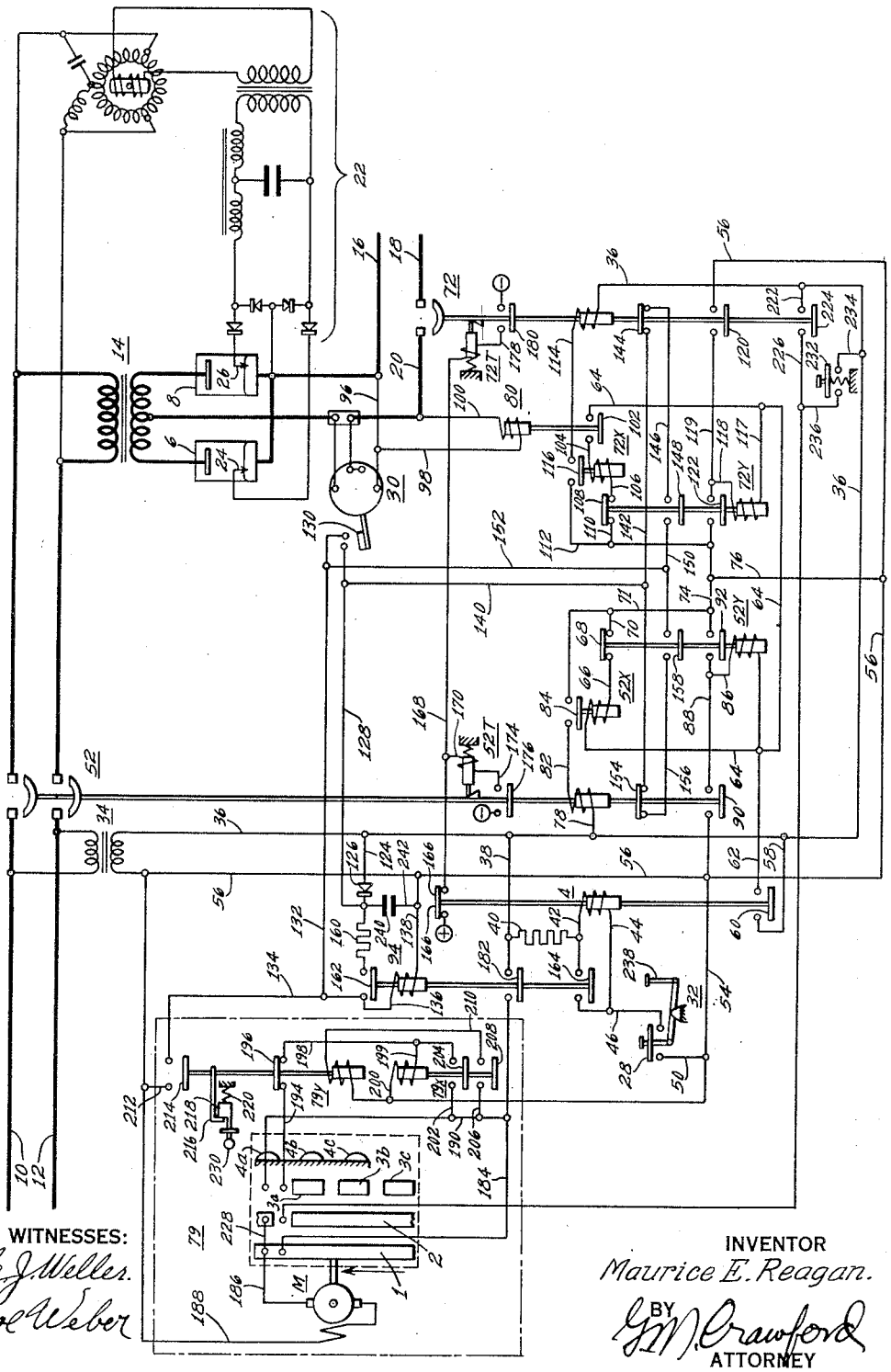
WITNESSES:
C. J. Weller.
Joe Weber
INVENTOR
Maurice E. Reagan.
BY
G. M. Crawford
ATTORNEY Patented Sept. 7, 1943

2,329,083

UNITED STATES PATENT OFFICE 2,329,083

CONTROL SYSTEM

Maurice E. Reagan, Pittsburgh, Pa., assignor to Westinghouse Electric & Manufacturing Company, East Pittsburgh, Pa., a corporation of Pennsylvania Application April 17, 1942, Serial No. 439,319

9 Claims. (Cl. 175—363)

The present invention relates, generally, to control systems and, more particularly, to systems for initiating and controlling the sequence of operations for placing rectifiers in service.

In the operation of arc rectifiers, for example, it sometimes happens that the main alternating current circuit breaker or the main direct current circuit breaker associated with the rectifier fails to latch closed when the rectifier is being placed into operation thus necessitating that the sequence of operations for placing the rectifier into service be repeated. It is common practice to deenergize and restart a rectifier in the event of arc-back in the rectifier.

An object of the present invention is to provide a control system for arc rectifiers, and the like, which shall function to automatically restart the sequence of operations for placing the rectifier into operation in the event that either the main direct current circuit breaker or the main alternating current circuit breaker associated with the rectifier fails to stay in closed position and/or in the event that an arc-back occurs in the rectifier, and which shall function to repeat such restarting operations a predetermined number of times in the event that there is a repeated failure of the breaker or breakers to stay closed or in the event that there are repeated arc-backs.

These and other objects and advantages of the invention will be apparent from the following detailed description taken in connection with the accompanying drawing, the single figure of which comprises a diagrammatic representation of a control system for an arc rectifier embodying the principal features of the invention.

Referring to the drawing, an arc rectifier comprising rectifier units 6 and 8 is connected to be energized from an alternating current power source, which is represented by conductors 10 and 12, through a transformer 14 and a main alternating current circuit breaker 52. A load circuit comprising conductors 16 and 18 is disposed to be energized by the rectifier unit on its direct current side, the load circuit conductor 18 being connected to the rectifier through a main direct current circuit breaker 72 and a conductor 20.

A firing circuit 22 is disposed to be energized by the closure of the circuit breaker 52 to properly energize the make-alive electrodes 24 and 26. This firing circuit may be any circuit commonly used for the purpose such as the firing circuit described in the copending application of W. E. Pakala and H. C. Myers, Serial No. 404,888, entitled "Ignitron firing circuit," filed July 31, 1941, and assigned to the assignee of the present application.

An automatic reclosing device 78, a master relay 4, a release relay 94, a reverse power relay 30, and a potential responsive relay 80 in cooperation with auxiliary relays 52X, 52Y, 72X and 72Y control the opening and closing of the circuit breakers 52 and 72.

The detailed elements of the control system and their cooperative relationships and functioning may best be understood by reference to the several cooperative elements of the system in a detailed description of the operation of the system which follows.

When it is desired to place the rectifier into operation the master relay 4 may be energized by manually actuating the left-hand contact element 28 of a toggle switch 32 to complete a circuit extending from one terminal of a transformer 34 through conductors 36 and 38, a current limiting resistor 40, a conductor 42, the winding of the relay 4, conductors 44, 46 and 48, the contact element 28 and conductors 50, 54 and 56 to the other terminal of the transformer 34. When the relay 4 is actuated a circuit will be closed for the relay 52X extending from one terminal of the transformer 34 through the conductors 36 and 58, a contact element 60 of the relay 4, conductors 62 and 64, the winding of the relay 52X, a conductor 66, a back contact element 68 of the relay 52Y and conductors 70, 71, 74, 76 and 56 to the other terminal of the transformer 34. The actuation of the relay 52X will close an energizing circuit for the closing coil of the circuit breaker 52 extending from one terminal of the transformer 34 through conductors 36 and 78, the winding of the closing coil of the circuit breaker 52, a conductor 82, a contact element 84 of the relay 52X and the conductors 71, 74, 76 and 56 to the other terminal of the transformer 34.

The circuit breaker 52 will thus be closed and latched in closed position by the latch trip device 52T. The closure of the circuit breaker 52 will complete an energizing circuit for the relay 52Y extending from one terminal of the transformer 34 through the conductors 36 and 58, the contact element 60, the conductors 62, the winding of the relay 52Y, conductors 86 and 88, a contact element 90 actuated by the circuit breaker 52 and conductors 54 and 56 to the other terminal of the transformer 34. The relay 52Y when actuated will open the energizing circuit for the relay 52X by moving the back contact element 68 to open circuit position and will close its own holding circuit which extends from one terminal of the transformer 34 through the conductors 36 and 58, the contact element 60, the conductors 62, the winding of the relay 52Y, the conductors 86 and 88, a contact element 92 of the relay 52Y and the conductors 74, 76 and 56 to the other terminal of the transformer 34. The relay 52Y will thus be held in actuated position so long as the master relay 4 is held in actuated position.

The closure of the circuit breaker 52 will cause the rectifier units 6 and 8 to be energized from the conductors 10 and 12 through the transformer 14 and will cause the firing circuit 22 to so energize the make-alive electrodes 24 and 26 as to start the arcs of the rectifier unit. When direct current appears on the conductors 16 and 20 the potential responsive relay 80 will be energized in a circuit extending from the conductor 16 through conductors 96 and 98, the winding of the relay 80 and a conductor 100 to the conductor 20.

When the relay 80 is actuated its contact element 102 will close an energizing circuit for the relay 72X extending from one terminal of the transformer 34 through the conductors 36 and 58, the contact element 60, the conductors 62 and 64, the contact element 102 of the relay 80, a conductor 104, the winding of the relay 72X, a conductor 106, a back contact element 108 of the relay 72Y and conductors 110, 112, 74, 76 and 56 to the other terminal of the transformer 34.

The actuation of the relay 72X will close an energizing circuit for the closing coil of the circuit breaker 72 extending from one terminal of the transformer 34 through the conductor 36, the winding of the closing coil of the circuit breaker 72, a conductor 114, a contact element 116 of the relay 72X and the conductors 112, 74, 76 and 56 to the other terminal of the transformer 34. When the circuit breaker 72 is thus closed it will be held in closed position by the latch trip device 72T to thereby supply direct current power to the direct current conductors 16 and 18.

The closure of the circuit breaker 72 will close an energizing circuit for the relay 72Y extending from one terminal of the transformer 34 through conductors 36 and 58, the contact element 68, the conductors 62, 64 and 117, the winding of the relay 72Y, conductors 118 and 119, a contact element 120 actuated by the circuit breaker 72 and conductor 56 to the other terminal of the transformer 34.

The relay 72Y when actuated will open the energizing circuit for the relay 72X by moving its back contact element 108 to open circuit position and will close its own holding circuit extending from one terminal of the transformer 34 through the conductors 36 and 58, the contact element 60, the conductors 62, 64 and 117, the winding of the relay 72Y, the conductors 118 and 119, a contact element 122 of the relay 72Y and the conductors 74, 76 and 56 to the other terminal of the transformer 34.

The relay 30 is connected to respond to arc-back or reverse current through the rectifier units 6 and 8 and when such an arc-back occurs the relay 30 will close an energizing circuit for the relay 94 extending from one terminal of the transformer 34 through conductors 36 and 124, a small rectifier unit 126, a conductor 128, a contact element 130 actuated by the relay 30, conductors 132, 134 and 136, the winding of the relay 94 and conductors 138 and 56 to the other terminal of the transformer 34.

This energizing circuit for the relay 94 may also be energized by the relay 72Y in actuated position and circuit breaker 72 in open position by a circuit which extends from the conductor 128 through conductors 140 and 142, a back contact element 144 actuated by the circuit breaker 72 in open circuit position, a conductor 146, a contact element 148 of the relay 72Y in actuated position and conductors 150 and 152 to the conductor 132. Similarly the conductors 128 and 132 may be bridged to energize the relay 94 by a circuit extending from the conductor 128 through the conductors 140 and 142, a contact element 154 actuated by the circuit breaker 52 in open circuit position, a conductor 156, a contact element 158 of the relay 52Y in actuated position and the conductors 150 and 152 to the conductor 132. Thus the relay 94 may be energized either by the relay 30 in response to arc-back or reverse current in the rectifiers 6 and 8 or the failure of either the circuit breaker 72 or 52 to properly latch when closed.

When the relay 94 is energized it will close its holding circuit extending from one terminal of the transformer 34 through the conductors 36 and 124, the rectifier unit 126, a current limiting resistor 160, a contact element 164 of the relay 94 the conductor 136, the winding of the relay 94, and the conductors 138 and 56 to the other terminal of the transformer 34. A contact element 164 of the relay 94 will close a shunting circuit for the winding of the master relay 4 extending from one terminal of the winding of the relay 4 through the conductor 42, the contact element 164 of the relay 94 and the conductors 46 and 44 to the other terminal of the winding of the relay 4.

The shunting of the winding of the relay 4 will cause it to be released and its back contact element 166 will close an energizing circuit for the trip device 52T of the circuit breaker 52 extending from positive potential of any suitable source of direct current control power indicated by the plus sign through the contact element 166, conductors 168 and 170, the winding of the trip device 52T, a conductor 174 and a contact element 176 of the circuit breaker 52 to negative potential. A similar energizing circuit for the trip device 72T of the circuit breaker 72 will be completed extending from positive potential through the contact element 166, the conductor 168, the winding of the trip device 72T, a conductor 178 and a contact element 180 of the circuit breaker 72 to negative potential. When the trip devices 52T and 72T are thus actuated the circuit breakers 52 and 72 will be opened. The release of the master relay 4 will cause its contact element 60 to move to open position to break the holding circuit for the relays 52Y and 72Y thus releasing these relays.

The energization of the relay 94 will close an energizing circuit for the drum actuating motor M of the automatic reclosing device 79 extending from one terminal of the transformer 34 through the conductors 36 and 38, a contact element 182 of the relay 94, a conductor 184, the drum contact element 1 of the reclosing device 79, a conductor 186, the drum motor M and conductors 188 and 56 to the other terminal of the transformer 34, and the contact drum of the reclosing device 79 will be driven by the motor M in the direction indicated by the arrow.

After a time interval the motor M will have moved the contact drum to a position where the moving contact element 3a will engage its associated fixed contact elements to close an energizing circuit for a relay 79X extending from one terminal of the transformer 34 through the conductors 36 and 38, the contact element 182, the conductor 184, a conductor 190, the contact element 3a, a conductor 194, a back contact element 196 of the relay 79Y, conductors 198 and 199, the winding of the relay 79X and conductors 200, 54 and 56 to the other terminal of the transformer 34.

The relay 79X will close its own holding circuit extending from one terminal of the transformer 3 through the conductors 36 and 38, the contact element 182, the conductors 184 and 190, a conductor 202, a contact element 204 of the relay 79X, the conductors 198 and 199, the winding of the relay 79X and the conductors 200, 54 and 56 to the other terminal of the transformer 34. The relay 79X will also close an energizing circuit for the relay 79Y extending from one terminal of the transformer 34 through the conductors 36 and 38, the contact element 182, the conductors 184 and 190, a conductor 206, a contact element 208 of the relay 79Y, and the conductors 54 and 56 to the other terminal of the transformer 34.

The actuation of the relay 79Y will move the contact element 196 to open circuit position and will close a shunt circuit for the winding of the relay 94 extending from one terminal of the winding of the relay 94, through the conductors 138, 56 and 188, a conductor 212, a contact element 214 of the relay 79Y and the conductors 134 and 136 to the other terminal of the winding of the relay 94.

The release of the relay 94 will cause its contact element 164 to move to open circuit position to thus open the shunting circuit for the winding of the master relay 4 and will move the contact element of the relay 94 to open circuit position to thus open the energizing circuit for the drum motor M of the automatic recloser 79, the movement of the contact element 182 of the relay 94 to open circuit position and also opening the holding circuit of the relay 79X and the energizing circuit of the relay 79Y hereinbefore described.

When the relay 79Y was actuated a detent 216 connected to the relay 79Y was moved upward beyond a stop member 218 to permit the stop member 218 to be moved to the left by a spring member 220. Upon release of the relay 79Y the detent 216 will engage the top portion of the stop member 218 after the relay 79Y has released sufficiently to move the contact element 214 to open circuit position but before the back contact element 196 has moved to closed circuit position.

The actuation of the master relay 4 will cause it to start the sequence hereinbefore described of closing the circuit breaker 52 which in turn will energize the rectifier elements 6 and 8 and strike their arcs which in turn will close the circuit breaker 72. If the circuit breakers 52 and 72 should stay in closed circuit position when thus reclosed, the circuit breaker 72 will close an energizing circuit for the drum actuating motor M extending from one terminal of the transformer 34 through the conductor 36, a conductor 222, the contact element 224 actuated by the circuit breaker 72, a conductor 226, a contact element 2 of the contact drum of the reclosing device 79, a conductor 228, the conductor 186, the motor M and the conductor 188 and 56 to the other terminal of the transformer 34.

When the drum has been rotated to a position where the lower one of the fixed contact elements, which are associated with the contact element 3a, has disengaged the contact element 3a a cam member 230 will be engaged by a cam member 4a which is movable with the contact drum to actuate the stop member 218 to the position shown in the drawing to thus permit the further and complete release of the relay 79Y to permit closure of the back contact element 196. The contact drum will continue to rotate until it reaches the position shown in the drawing at which time the lower contact element associated with the drum contact element 2 will disengage the contact element 2 to break the energizing circuit for the motor M and cause the motor M to stop in the position shown in the drawing.

In the event that either the circuit breaker 52 or the circuit breaker 72 should fail to latch on being reclosed after the first time interval as described hereinbefore, or in the event that another arc-back should occur upon the reclosure of circuit breaker 72, the relay 94 will again be energized as explained hereinbefore to again operate the drum actuating motor M to thereby cause the cam elements 230 and 4a to completely release the relay 79Y as hereinbefore described and to cause the circuit breakers 52 and 72 to be tripped by the shunting of the winding of the relay 4 by the contact element 64 of the relay 94. After the interval required for the drum to move its contact element 3b into engagement with its associated fixed contact elements the relays 79X and 79Y will be actuated to release the relay 94 which in turn will actuate the relay 4 to again initiate the sequence of closure of the circuit breaker 52, restarting of the rectifier elements 6 and 8 and closure of the circuit breaker 72.

A third attempt to restart the rectifier system will be made in the event that the breakers 52 and 72 are again tripped by an immediate arc-back or by failure of either of the breakers 52 and 72 to remain latched in the closed position, and if the relay 94 is again energized after this third attempt its contact element 194 will cause the drum actuating motor M to operate until the lower fixed contact element associated with the drum contactor 1 is disengaged by the drum contact 1 to thus break the motor circuit and stop the motor. The system will thus be locked out with the relay 94 held energized in its own holding circuit until such time as any apparatus faults that might have caused the three consecutive releases of the system can be remedied.

After the faults have been remedied and it is desired to place the apparatus in operation again, the drum actuating motor M may be energized again by a manually controlled contact element 232 in a circuit extending from one terminal of the transformer 34 through the conductor 36, a conductor 234, the contact element 232, conductors 236 and 246, the drum contact element 2, conductors 228 and 186, the drum actuating motor M and the conductors 188 and 56 to the other terminal of the transformer 34. When the drum has moved to the position shown in the drawing, this energizing circuit for the drum actuating motor M will be broken by the disengagement of the drum contact element 2 from its associated fixed contact elements and the drum will be stopped in the restart position shown in the drawing ready to perform the function of making a plurality of attempts at restoring the system as hereinbefore described.

When it is desired to take the system out of service, for any reason, a manually actuable operator 238 of the toggle switch 32 may be actuated to move the contact element 28 to open circuit position to thus break the energizing circuit for the master relay 4 which in turn will trip the breakers 52 and 72 and release the relays 52Y and 72Y as explained hereinbefore.

It sometimes happens that an arc-back occurring on the rectifier units 6 and 8 will be of such magnitude and will draw such large current in the conductors 10 and 12 as to lower the potential applied to the winding of the relay 94 through the transformer 34 to a point where there will be insufficient potential to operate this relay. To insure the positive tripping of the relay 94 in such an event, a condenser 240 is connected to be held continuously charged in a circuit extending from one terminal of the transformer 34 through the conductors 36 and 134, the rectifier units 126, the conductor 128, the conductor 240, a conductor 242 of the conductors 138 and 56 to the other terminal of the transformer 34. When the contact element 130 closes the energizing circuit for the relay 94, the condenser 240 will be discharged in this energizing circuit to thus provide an impulse of current sufficient to positively actuate the relay 94.

Thus it will be seen that I have provided a control system for an arc rectifier which shall function to automatically restart the sequence of operation for placing the rectifier into operation in the event that either the main direct current circuit breaker or the main alternating current circuit breaker associated with the rectifier fails to stay in closed position and/or in the event that an arc-back occurs in the rectifier, and which shall function to repeat such restarting operations a predetermined number of times in the event that there is a repeated failure of the breaker or breakers to stay closed or in the event that there are repeated arc-backs.

In compliance with the requirements of the patent statutes, I have shown and described herein a preferred embodiment of my invention. It is to be understood, however, that the invention is not limited to the precise construction shown and described herein but is capable of modification by one skilled in the art, the embodiment shown herein being merely illustrative of the principles of my invention.

I claim as my invention

1. In a control system for rectifiers, a first circuit breaker for connecting a supply of power to the rectifier, a second circuit breaker for connecting a load circuit to the rectifier, means for closing the first breaker, means responsive to the closure of the first breaker for initiating the operation of the rectifier, means responsive to the operation of the rectifier for closing the second breaker, relay means responsive to the failure of either of the breakers to stay closed upon being closed for opening the other of the breakers, and means responsive to the operation of said relay means for automatically actuating said first breaker closing means.

2. In a rectifier control system, a first circuit breaker for controlling the supply of power to the rectifier, a second circuit breaker for controlling the power load on the rectifier, means for closing the first breaker, means responsive to the closure of the first breaker for starting the operation of the rectifier, means responsive to the rectifying action of the rectifier for closing the second breaker, opening means for each of the breakers, relay means for actuating said opening means, means responsive to the failure of either of said breakers to stay closed upon being closed and to reverse current flow in the rectifier for actuating said relay means, and means responsive to the actuation of said relay means for actuating the means for closing the first breaker.

3. In an arc rectifier control system, a first circuit breaker for controlling the supply of power to the rectifier, a second circuit breaker for controlling the power load on the rectifier, means for closing the first breaker, means responsive to the closure of the first breaker for starting the rectifier arc, means responsive to the rectifying action of the rectifier for closing the second breaker, opening means for each of the breakers, relay means for actuating said opening means, means responsive to the failure of either of said breakers to stay closed upon being closed and to reverse current flow in the rectifier for actuating said relay means, means responsive to the actuation of said relay means for actuating the means for closing the first breaker, and means for preventing further reclosure of the first circuit breaker after a predetermined number of closures in the event that the breaker is opened after each reclosure.

4. In an arc rectifier control system, a first circuit breaker for controlling the supply of power to the rectifier, a second circuit breaker for controlling the power load on the rectifier, means for closing the first breaker, means responsive to the closure of the first breaker for starting the rectifier arc, means responsive to the rectifying action of the rectifier for closing the second breaker, relay means responsive to the failure of either of the breakers to stay closed upon being closed for opening the other of the breakers, means responsive to the said relay means for actuating said first breaker closing means, and means for preventing further reclosure of the first circuit breaker after a predetermined number of closures in the event that the breakers are opened after each reclosure.

5. In an arc rectifier control system, a first circuit breaker for controlling the supply of power to the rectifier, a second circuit breaker for controlling the power load on the rectifier, means for closing the first breaker, means responsive to the closure of the first breaker for starting the rectifier arc, means responsive to the rectifying action of the rectifier for closing the second breaker, opening means for each of the breakers, relay means for actuating said opening means, means responsive to the failure of either of said breakers to stay closed upon being closed and to reverse current flow in the rectifier for actuating said relay means, means responsive to the actuation of said relay means for actuating the means for closing the first breaker, and means for preventing further reclosure of the first breaker for a predetermined time after each reclosure and for limiting the number of reclosures in the event that the breakers are opened after each reclosure.

6. In an arc rectifier control system, a first circuit breaker for controlling the supply of power to the rectifier, a second circuit breaker for controlling the power load on the rectifier, means for closing the first breaker, means responsive to the closure of the first breaker for starting the rectifier arc, means responsive to the rectifying action of the rectifier for closing the second breaker, opening means for each of the breakers, a relay means for actuating said opening means, means responsive to the failure of either of said breakers to stay closed upon being closed for actuating said relay means, and means responsive to the opening of the second breaker for releasing said relay means and actuating said closing means for the first breaker.

7. In an arc rectifier control system, a first circuit breaker for controlling the supply of power to the rectifier, a second circuit breaker for controlling the load circuit of the rectifier, means for closing each of the breakers comprising a first auxiliary relay for closing each of the breakers, a second auxiliary relay for each of the breakers actuable by the closure of its associated breaker, circuit means whereby the actuation of either of said second auxiliary relays deenergizes its associated first auxiliary relay, circuit means responsive to the closure of said breakers for energizing their associated second auxiliary relays, means responsive to the closure of the first breaker for starting the rectifier arc, means responsive to the rectifying action of the rectifier for actuating the first auxiliary relay associated with the second breaker, opening means for each of the breakers, and means responsive to either of said second auxiliary relays in actuated position and the failure of either of said breakers to stay closed upon being closed for releasing said second auxiliary relays and actuating the opening means for each of the breakers.

8. In an arc rectifier control system, a first circuit breaker for controlling the supply of power to the rectifier, a second circuit breaker for controlling the load circuit of the rectifier, means for closing each of the breakers comprising a first auxiliary relay for closing each of the breakers, a second auxiliary relay for each of the breakers actuable by the closure of its associated breaker, circuit means whereby the actuation of either of said second auxiliary relays deenergizes its associated first auxiliary relay, circuit means responsive to the closure of said breakers for energizing their associated second auxiliary relays, means responsive to the closure of the first breaker for starting the rectifier arc, means responsive to the rectifying action of the rectifier for actuating the first auxiliary relay associated with the second breaker, opening means for each of the breakers, a release relay, means responsive to reverse current flow in the rectifier for energizing said release relay, means responsive to either of said second auxiliary relays in actuated position and the failure of either of said breakers to stay closed upon being closed for energizing said release relay, and means responsive to the actuation of said release relay for releasing said second auxiliary relays and actuating the opening means for each of the breakers.

9. In an arc rectifier control system, a first circuit breaker for controlling the supply of power to the rectifier, a second circuit breaker for controlling the load circuit of the rectifier, means for closing each of the breakers comprising a first auxiliary relay for closing each of the breakers, a second auxiliary relay for each of the breakers actuable by the closure of its associated breaker, circuit means whereby the actuation of either of said second auxiliary relays deenergizes its associated first auxiliary relay, circuit means responsive to the closure of said breakers for energizing their associated second auxiliary relays, means responsive to the closure of the first breaker for starting the rectifier arc, means responsive to the rectifying action of the rectifier for actuating the first auxiliary relay associated with the second breaker, opening means for each of the breakers, a release relay, means responsive to reverse current flow in the rectifier for energizing said release relay, means responsive to either of said second auxiliary relays in actuated position and the failure of either of said breakers to stay closed upon being closed for energizing said release relay, means responsive to the actuation of said release relay for releasing said second auxiliary relays and actuating the opening means for each of the breakers, means for delaying subsequent reclosures of the first breaker in the event that the breakers are opened after each reclosure, and means for limiting the number of such subsequent reclosures.

MAURICE E. REAGAN.